United States Patent [19]

Chibata et al.

[11] 3,742,041

[45] June 26, 1973

[54] PROCESS OF RESOLVING DL-SERINE M-XYLENE-4-SULFONATE

[75] Inventors: Ichiro Chibata, Suita-shi, Osaka-fu; Shigeki Yamada, Toyonaka-shi, Osaka-fu; Masao Yamamoto, Kyoto-fu, all of Japan

[73] Assignee: Tanabe Seiyaku Co., Ltd., Osaka, Japan

[22] Filed: Oct. 2, 1969

[21] Appl. No.: 863,375

[30] Foreign Application Priority Data

Oct. 4, 1968  Japan.............................. 43/72249
Oct. 4, 1968  Japan.............................. 43/72250

[52] U.S. Cl. ...................... 260/501.12, 260/534 M
[51] Int. Cl. ......................................... C07c 143/28
[58] Field of Search ............................. 260/501.12

[56] References Cited

UNITED STATES PATENTS 3,523,969  8/1970  Chibata et al. ................ 260/501.12

*Primary Examiner*—Leon Zitver
*Assistant Examiner*—Michael W. Glynn
*Attorney*—Harry C. Bierman, Jordan B. Bierman and Bierman and Bierman

[57] ABSTRACT

A supersaturated solution of DL-serine m-xylene-4-sulfonate is prepared. The solution is seeded with crystals of one of the optically active enantiomers of said DL-serine m-xylene-4-sulfonate before and/or after the solution reaches the point of supersaturation. Crystallization is permitted to take place and the resultant crystals are recovered. The resulting enantiomer is useful as an intermediate in preparing optically active serine.

10 Claims, No Drawings

PROCESS OF RESOLVING DL-SERINE M-XYLENE-4-SULFONATE

This invention relates to the resolution of DL-serine m-xylene-4-sulfonate by selective crystallization, and provides a novel process for the preparation of optically active serine.

Naturally occuring serine is in the optically active L-form. It is an important component of animal diets, whereas the enantiomorphic D-serine has no known nutritional value. However, D-serine is very useful as an intermediate for the synthesis of the antibiotic D-cycloserine.

Synthetic serine is optically inactive and consists of equal parts of the two enantiomorphic isomers. Thus the commercial value of synthetic serine could be doubled if the isomeric mixture were resolved into D- and L-serine.

The most commonly used method of resolving DL-serine comprises treating an acyl-DL-serine with an optically active resolving agent such as brucine or quinine, fractionally crystallizing the resulting mixture or diastereoisomers and hydrolyzing the product. Alternatively, the N-acyl-DL-serine can be asymmetrically hydrolyzed by the action of acylase. But these methods have been found to be disadvantageous as they require the use of expensive alkaloids or the preparation of the enzyme.

A racemic modification of an organic compound can generally be resolved by selective crystallization into each of its optically active enantiomers if said racemic modification exists in the form of a racemic mixture. However, it is impossible to predict whether or not a given racemic modification has such beneficial properties and whether or not resolution of a given racemic modification is possible. Only rare compounds satisfy those requirements. Therefore, racemic modification must be further studied experimentally to determine whether selective crystallization can be accomplished. Although the method of selective crystallization is useful for the commercial production of optically active amino acid, DL-serine itself can be resolved by such a method.

It has now been found that, when DL-serine is converted into DL-serine m-xylene-4-sulfonate (which is hereinafter designated as DL-serine m-xylenesulfonate), the said salt has many beneficial properties which make it suitable for selectively crystallizing it into each of its optically active enantiomers. Namely, the racemic modification of serine m-xylenesulfonate is more soluble than both of its enantiomers; a saturated solution of the racemic modification will not dissolve any more of the individual enantiometer; the supersaturated solution of an enantiomer is stable even after the selective crystallization of the other optically active enantiomer; prompt crystallization of each of the enantiomers is afforded; and an optically active enantiomer of serine m-xylenesulfonate can be selectively crystallized out of a supersaturated solution of the racemic modification or from a supersaturated solution containing the racemic modification and one of the enantiomers.

An object of this invention is, therefore, to provide an economical and commercially useful process for the resolution of DL-serine m-xylenesulfonate into each of its enantiomers. The process of the present invention is free of the disadvantages of the abovementioned known methods. Further, according to the process of the present invention, the yield of a desired optically active serine m-xylenesulfonate may be remarkably increased due to the suitable solubility of said salt in water. Another object of this invention is to provide a novel method for the industrial production of optically active serine prepared from optically active serine m-xylenesulfonate. Other objects of this invention will be apparent from the following descriptions and claims.

The process, according to the present invention, comprises producing a supersaturated solution of DL-serine m-xylenesulfonate in a solvent, seeding or dissolving one of the optically active enantiomers thereof into the solution thus making it predominant over the other enantiomer in the solution; allowing the predominant enantiomer to crystallize out; and then recovering it from the solution.

In one embodiment of the invention, a small amount of crystals of one of the enantiomers is added to the supersaturated solution as a seed and the mixture is stirred to cause selective crystallization of the enantiomer which is the same as that which was seeded. Alternatively, a small amount of one of the enantiomers is dissolved in a hot solution of the racemic modification in order to make the said enantiomer dominant over the other in the solution. The solution is then cooled whereby spontaneous crystallization of the enantiomer which is the same as that which was added takes place. It is also possible to combine these procedures. Namely, a partial amount of the crystals of one of the enantiomers is dissolved in the solution of the racemic modification and the remaining part is used to seed the supersaturated solution in which one of the enantiomers is dominant over the other. In this case, the seeding amount can be minimized. The supersaturated solution may be prepared from a solution of serine m-xylenesulfonate in a suitable solvent using conventional procedures as for example refrigeration, concentration, addition of appropriate solvents or a combination of these operations. For the preparation of the supersaturated solution thereof, however, it is most convenient to cool a hot solution saturated with serine m-xylenesulfonate, as the solubility thereof increases with an increase in the temperature.

The seed crystals to be used should have a high optical purity. However, the equivalent mixture of D- and L-enantiomers need not always be used as the starting material for the resolution. The non-equivalent mixture thereof can also be used for this purpose. It is rather convenient to use the non-equivalent mixture thereof as the starting material of the present invention, because the predominant enantiomer in the mixture may be spontaneously crystallized out from the supersaturated solution of said material. The preferred amount of the seed to be added is about 0.1 percent by weigh based on the weight of the solution. It should be noted that the greater the amount of the seed, the better the resultant resolution. If the solution already contains an optically active enantiomer dominant over its antipode because of the natural occurence of the seed crystals, the need for seeding with seed crystals of the optical enantiomer which is dominant over the other is obviated. Nevertheless, for smooth resolution seeding is preferred. Although the temperature at which the crystallization is carried out is not critical for the method of the invention, a temperature of about room temperature is preferred. Any inert solvent which can dissolve DL-serine m-xylenesulfonate and which can crystallize out the compound as a racemic mixture is suitable in the process of selective crystallization. Water, an aqueous solvent, for example, a solution containing alkanols having up to six carbon atoms or an alkanone having up to six carbon atoms are suitable for this purpose. From an industrial standpoint water is the most suitable solvent. After one of the optically active enantiomers has been crystallized out and separated from the mother liquor, the other enantiomer remaining in said mother liquor becomes dominant over the enantiomer which was crystallized out. The mother liquor may again be employed for the optical resolution of the other enantiomer. For this purpose in order to produce the supersaturated solution of the enantiomorphic mixture, the mother liquor is concentrated. Alternatively, a quantity of the racemic modification, which quantity is preferably equal to the amount of the enantiomer previously separated, may be dissolved in the mother liquor. The procedure which was carried out in the previous operation is then repeated to separate out the other enantiomer. In this case, if the amount of the racemic modification to be added is adjusted equal to the amount of the enantiomer previously separated, the same condition with the previous operation can be afforded except that the predominant enantiomer in the solution is the antipode of the enantiomer previously separated. Thus the cycle of the operation may be preferably repeated, whereby the racemic modification supplied may be successively and entirely resolved into each of the D- and L-enantiomers.

The process of the present invention can be carried out not only by the batch system as mentioned above, but also by the continuous system which comprises, for example, the steps of passing the supersaturated solution through a column containing the seed crystals, and allowing an optically active serine m-xylenesulfonate to crystallize out selectively in the said column. Alternatively, the process of the present invention can be carried out by immersing the seeding plates of optically active enantiomers in the supersaturated solution and allowing the optical enantiomers to crystallize out on the seeding plates.

The resultant crystals thus obtained may sometimes be optically impure due to the degree of supersaturation and the amount of crystals separated. The crude crystals, however, may be easily purified, because the solubility of the racemic modification is sufficiently higher than that of each enantiomer and the said optically active enantiomer will be dissolved in the saturated solution of the racemic modification. Namely, the optically pure crystals of serine m-xylenesulfonate can be obtained by adding the crude crystals into a minimal amount of solvent will dissolve the racemic modification in the said crude crystals, stirring the solution and then recovering the resultant crystals from the solution. Alternatively, the optically pure crystals of serine m-xylenesulfonate can be obtained by dissolving the crude crystals, for example, at an elevated temperature in a small amount of solvent which dissolves the racemic modification in the crude crystals, allowing the said enantiomer to crystallize out and recovering it from the solution. Such operations as refrigeration, concentration, the addition of a solvent or combinations thereof may be used for crystallization of the optically active enantiomer from the solution. Any inert solvents which are described above may also be used for this purpose.

When only a small amount of solvent is needed due to the low content of the racemic modification in said crude crystals or the high solubility of the racemic modification, it is convenient to carry out the above operation by adding a suitable amount of the solution saturated with DL-serine m-xylenesulfonate.

Optically active serine can be obtained from optically active serine m-xylenesulfonate without racemization by treating with ion-exchange resin and liberating the resultant optically active serine.

DL-serine m-xylenesulfonate, a starting compound of the present invention can be prepared by neutralizing DL-serine with m-xylene-sulfonic acid in a suitable solvent.

Serine m-aminoxylenesulfonate is a novel compound in both the racemic modification form and the optically active form. The physical properties of serine m-aminoxylenesulfonate are shown in the following Tables.

TABLE I

| Serine m-xylene-sulfonate | M.p. (°C.) | Specific rotation (C= 4, water) |
|---|---|---|
| DL-form | 157°–158° | 0 |
| D-form | 172°–173° | −4.05 |
| L-form | 172°–173° | +4.05 |

TABLE II

| Temperature (°C.) | Solubility (g./100g. of water) | |
|---|---|---|
| | L-form | DL-form |
| 15 | 23.5 | 45.1 |
| 25 | 39.5 | 80.9 |
| 40 | 86.8 | 175.4 |

As will be apparent from the data represented by Tables I — II, serine m-xylenesulfonate has beneficial properties suitable for the selective crystallization of the racemic modification into each of its optically active enantiomers.

EXAMPLE 1

114.0 g. of DL-serine m-xylenesulfonate are dissolved in 100 ml. of water under heating. The solution is then cooled to 30°C. 4.0 g. of L-serine m-xylenesulfonate 2 hydrate is seeded into the solution. The mixture is stirred for 65 minutes at the same temperature. Then the resultant crystals are collected by filtration. The crystals thus obtained are washed with a small amount of cool water, and acetone and dried at 50°C. under ventilation whereby 9.5 g. of L-serine m-xylenesulfonate are obtained. $[\alpha]_D^{25} = +4.05°$ ( C = 4, $H_2O$ ) Optical purity: 100 percent Nitrogen analysis calculated: 4.81 Found: 4.76

6.0 g. of the crystals are dissolved in 60 ml. of water and the solution is passed through a column of 20 ml. of ion-exchange resin (Amberlite IR–120, H-form). The column is washed with water and eluted with 1N-aqueous ammonia. The eluate is concentrated and methanol is added to the residue to yield 2.1 g. of L-serine. $[\alpha]_D^{25} = +14.6°$ ( C = 2, N—HCl )

Nitrogen analysis: Calculated: 13.33 Found: 13.37

EXAMPLE 2

58.2 g. of DL-serine m-xylenesulfonate and 1.8 g. of D-serine m-xylenesulfonate are dissolved in 50 ml. of water under heating and then cooled to 30°C. 0.1 g. of D-serine m-xylenesulfonate is seeded into the solution. The mixture is stirred for 90 minutes at the same temperature. The resulting crystals are collected by filtration. The crystals thus obtained are treated in the same manner as described in Example 1 whereby 5.0 g. of D-serine m-xylenesulfonate are obtained. $[\alpha]_D^{25} = -3.98°$ ( C = 4, H$_2$O ) Optical purity: 98.3 percent 3.0 g. of the crystals are treated with ion-exchange resin in the same manner as described in Example 1 to yield 1.0 g. of D-serine.

$[\alpha]_D^{25} = -14.4°$ ( C = 2, 1N—HCl )

EXAMPLE 3

47.0 g. of DL-serine m-xylenesulfonate are dissolved in 50 ml. of water under heating and then cooled to 25°C. 50 mg. of D-serine m-xylene-sulfonate is seeded into the solution. The mixture is stirred for 50 minutes at the same temperature. The resultant crystals are collected by filtration whereby 6.3 g. of D-serine m-xylenesulfonate are obtained.

$[\alpha]_D^{25} = -4.05°$ ( C = 4, H$_2$O )  Optical purity: 100 percent 6.9 g. of DL-serine m-xylenesulfonate are dissolved under heating in the mother liquor obtained in the above operation. The solution is cooled to 25°C. and 50 mg. of L-serine m-xylenesulfonate is seeded into the solution. The mixture is stirred for 50 minutes at the same temperature. The resultant crystals are treated in the same manner as described in Example 1 to yield 6.1 g. of L-serine m-xylenesulfonate.

$[\alpha]_D^{25} = +3.95°$( C = 4, H$_2$O ) Optical purity: 97.5 percent

EXAMPLE 4

35.0 g. of DL-serine m-xylenesulfonate and 1.5 g. of D-serine m-xylenesulfonate are dissolved in 25 ml. of aqueous ethanol (20 percent v/v) under heating. The solution is then cooled to 30°C. 50 mg. of D-serine m-xylenesulfonate is seeded into the solution. The mixture is stirred for 50 minutes at the same temperature. The resultant crystals are collected by filtration whereby 4.1 g. of D-serine m-xylene-sulfonate are obtained. $[\alpha]_D^{25} = -3.93°$ ( C = 4, H$_2$O ) Optical purity: 97.0 percent

EXAMPLE 5

23.5 g. of DL-serine m-xylenesulfonate and 1.5 g. of D-serine m-xylenesulfonate are dissolved in 20 ml. of aqueous acetone (50 percent v/v) under heating. The solution is then cooled to 25°C 50 mg. of DL-serine m-xylenesulfonate is seeded into the solution. The mixture is stirred for 40 minutes at the same temperature. The resultant crystals are collected by filtration whereby 3.3 g. of D-serine m-xylenesulfonate are obtained.

$[\alpha]_D^{25} = -3.95°$ ( C = 4, H$_2$O ) Optical purity: 97.5 percent

EXAMPLE 6

10 g. of L-serine m-xylenesulfonate (optical purity: 87.7 percent) are added to a mixture of 1.5 ml. of water and 25 ml. of a solution saturated with DL-serine m-xylenesulfonate at 25°C. The mixture is then heated until solution is complete. After cooling to 25°C., the solution is stirred for 1.5 hours. The resultant crystals are collected by filtration, washed with a small amount of water and acetone and dried at 50°C. whereby 8.5 g. of L-serine m-xylenesulfonate are obtained.

$[\alpha]_D^{25} = +4.05°$ ( C = 4, H$_2$O ) Optical purity: 100 percent

EXAMPLE 7

50 g. of L-serine m-xylenesulfonate (optical purity: 92.6 percent) are added to a mixture of 3.6 ml. of water and 100 ml. of a solution saturated with DL-serine m-xylenesulfonate at 30°C. The mixture is then heated until solution is complete. After cooling to 30°C., the solution is stirred for 1.5 hours. The resultant crystals are collected by filtration, washed with a small amount of water, acetone and dried whereby 45.6 g. of L-serine m-xylenesulfonate are obtained.

$[\alpha]_D^{25} = +4.05°$ ( C = 4, H$_2$O ) Optical purity: 100 percent

EXAMPLE 8

12 g. of D-serine m-xylenesulfonate (optical purity: 75.3 %) are added to a mixture of 3.7 ml. of water and 20 ml. of a solution saturated with DL-serine m-xylenesulfonate at 25°C. The mixture is then heated until solution is complete. After cooling to 25°C., the solution is stirred for two hours. The resultant crystals are collected by filtration, washed with water, acetone and dried whereby 8.8 g. of D-serine m-xylenesulfonate are obtained.

$[\alpha]_D^{25} = -4.05°$ ( C = 4, H$_2$O ) Optical purity: 100 percent

EXAMPLE 9

13.5 g. of L-serine m-xylenesulfonate (optical purity: 61.7 percent) are added to a mixture of 4.4 ml. of 20 percent (v/v) aqueous ethanol and 15 ml. of a solution saturated with DL-serine m-xylenesulfonate in 20 percent (v/v) aqueous ethanol at 30°C. The mixture is then heated until solution is complete. The solution is stirred for two hours at 30°C. The resultant crystals are collected by filtration, washed with a small amount of 20 percent (v/v) aqueous ethanol, acetone and dried whereby 8.1 g. of L-serine m-xylenesulfonate are obtained.

$[\alpha]_D^{25} = +4.05°$ ( C = 4, H$_2$O ) Optical purity: 100 percent

EXAMPLE 10

10 g. of D-serine m-xylenesulfonate (optical purity: 72.8 percent) are added to a mixture of 2.6 ml. of 50 percent (v/v) aqueous acetone and 20 ml. of a solution saturated with DL-serine m-xylenesulfonate in 50 percent (v/v) aqueous acetone at 30°C. The mixture is then heated until solution is complete. The solution is stirred for 2.5 hours at 30°C. The resultant crystals are collected by filtration, washed with a small amount of acetone and dried whereby 7.1 g. of D-serine m-xylenesulfonate are obtained. Optical purity: 100 percent

What is claimed is:

1. A process for resolving DL-serine m-xylene-4-sulfonate into its optically active enantiomers which comprises the steps of adding crystals of one of said enantiomers to a solution of DL-serine m-xylene-4-sulfonate in water, a mixture of water and an alkanol having up to six carbon atoms, or a mixture of water and an alkanone having up to six carbon atoms and supersaturating said solution whereby crystallization of said one of said enantiomers from the solution is initiated then recovering the crystallized one of said enantiomers.

2. A process as claimed in claim 1 wherein said one of said enantiomers is added as seed crystals to the supersaturated solution of DL-serine m-xylene-4-sulfonate.

3. A process as claimed in claim 2 in which the amount of the seed crystals added is about 0.1 weight percent based on the weight of the solution.

4. A process as claimed in claim 1 wherein said one of said enantiomers is added to the solution of DL-serine m-xylene-4-sulfonate at an elevated temperature then the DL-serine m-xylene-4-sulfonate solution is cooled to produce said supersaturated solution.

5. A process as claimed in claim 1 wherein said one of said enantiomers is added to the solution of DL-serine m-xylene-4-sulfonate at an elevated temperature then the DL-serine m-xylene-4sulfonate solution is cooled to produce said supersaturated solution and the supersaturated solution is innoculated with seed crystals of said one of said enantiomers.

6. A process as claimed in claim 1 further including the steps of dissolving, at elevated temperature, additional DL-serine m-xylene-4-sulfonate in mother liquor obtained after the recovery of said crystallized one of said enantiomers thereby producing another supersaturated solution, allowing crystallization to take place and recovering the crystallized other one of said enantiomers.

7. A process as claimed in claim 6, wherein said process is repeated a plurality of times whereby said optically active enantiomers are successively and alternatively separated as crystals from the solution of DL-serine m-xylene-4-sulfonate.

8. DL-serine m-xylene-4-sulfonate.

9. D-serine m-xylene-4-sulfonate.

10. L-serine m-xylene-4-sulfonate.

* * * * *